United States Patent [19]

Myers et al.

[11] Patent Number: 4,685,299
[45] Date of Patent: Aug. 11, 1987

[54] THREADED SLEEVE MEMBER FOR CONNECTING MASTER CYLINDER TO VACUUM BOOSTER

[75] Inventors: Lawrence R. Myers, South Bend, Ind.; Robert F. Gaiser, Stevensville, Mich.

[73] Assignee: Allied Corporation, Morristown, N.J.

[21] Appl. No.: 812,585

[22] Filed: Dec. 23, 1985

[51] Int. Cl.$^4$ ............... B60T 13/00; B60T 11/20; F15B 7/08; F01B 29/00
[52] U.S. Cl. .................... 60/547.1; 60/562; 60/589; 92/13.41; 92/128; 403/343
[58] Field of Search .......... 92/13.41, 169.2, 128; 60/547.1, 562, 585, 588, 589; 403/343, 299

[56] References Cited

U.S. PATENT DOCUMENTS

| | | | |
|---|---|---|---|
| 3,013,537 | 12/1961 | Schultz | 60/547.1 X |
| 3,127,966 | 4/1964 | Sheriff et al. | 60/547.1 X |
| 3,200,914 | 8/1965 | Downs et al. | 60/547.1 X |
| 3,473,330 | 10/1969 | Fritz | 60/588 |
| 3,513,655 | 5/1970 | Reznicek | 60/562 |
| 4,307,570 | 12/1981 | Yardley | 60/547.1 |
| 4,429,531 | 2/1984 | Spielmann | 60/588 |
| 4,453,380 | 6/1984 | Meynier | 60/547.1 X |
| 4,474,005 | 10/1984 | Steer | 60/562 |
| 4,481,865 | 11/1984 | Becht et al. | 60/547.1 X |

FOREIGN PATENT DOCUMENTS 1449363 7/1966 France ................... 403/343

Primary Examiner—Robert E. Garrett
Assistant Examiner—George Kapsalas
Attorney, Agent, or Firm—Leo H. McCormick, Jr.; Ken C. Decker

[57] ABSTRACT

A method of attaching a master cylinder (12) to a shell (78) of a vacuum brake booster (14) through a sleeve connecting member (62). The sleeve connecting member (62) has internal threads (64) and external threads (66). The master cylinder (12) has an insert 30 which is screwed into the internal theads (64) and the shell (78) of the booster (14) screwed onto the external threads (66) until the internal components (52, 54, 98 etc.) of the master cylinder (12) and vacuum brake booster (14) are in proper alignment. Thereafter, the master cylinder (12) and shell (78) are held stationary and the sleeve (62) is screwed into the shell (78) to lock the master cylinder (12) and shell (78) in a fixed relationship.

6 Claims, 1 Drawing Figure

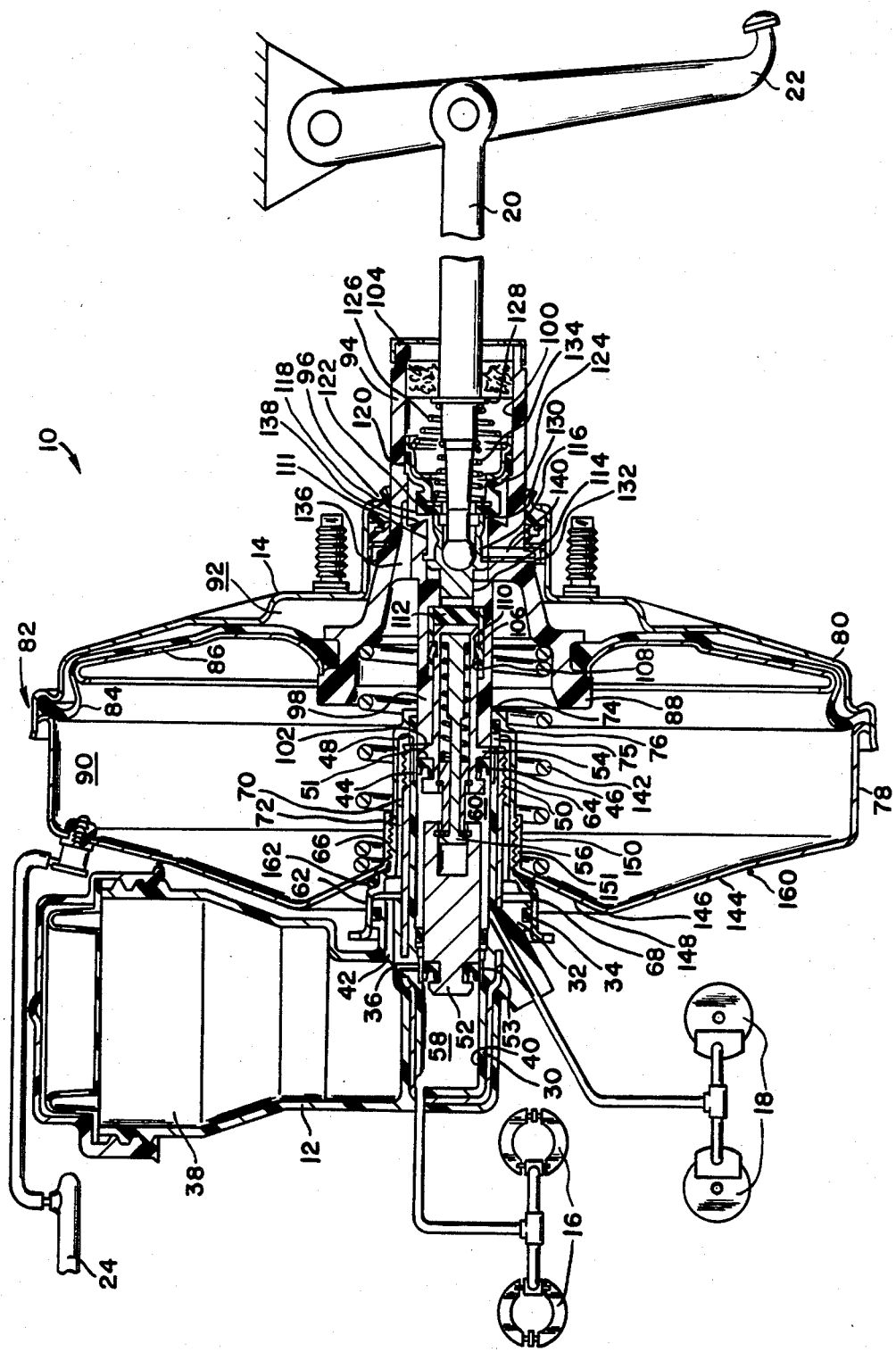

THREADED SLEEVE MEMBER FOR CONNECTING MASTER CYLINDER TO VACUUM BOOSTER

The invention relates to a structure through which a master cylinder is connected to a vacuum brake booster.

In recent years, there has been a great emphasis on reducing the overall weight of automotive vehicles in order to increase the mileage capability of such vehicles. This has resulted in not only an emphasis on providing more simplified structures, but in eliminating heavy materials utilized in the manufacture of many components. The use of plastics has increased dramatically, to the extent that many of the interior and exterior components of an automobile are plastic. U.S. patent application Ser. No: 676,978 filed Nov. 30, 1984 now abandoned, disclosed a plastic master cylinder which is insert molded about a metal liner tube. As with most master cylinders, the housing of the master cylinder is connected to either the firewall of the vehicle or vacuum assist device through bolts that extend through an external flange.

In an effort to reduce the weight of a vacuum brake booster and yet retain the structural unity needed to develop a desired output force without excessive deflection it was disclosed in U.S. Pat. No. 4,571,942 that an evolutive profile in the front shell could substantially reduce deflection. Yet with such profile, there still exist some stress concentration points in the area where the bolts carry the reaction forces from the master cylinder into the shell.

The instant invention discloses a method of attaching the housing of a master cylinder to the shell of a vacuum brake booster through the use of a threaded sleeve member. The sleeve member uniformly distributes any reaction forces that are developed in the master cylinder into the shell of the vacuum brake booster. The shell of the brake booster while possessing an evolutive profile has a central section with an inverted evolutive profile which resists deflection during the development of operational output forces. The sleeve member is threaded on both its inside and outside surfaces. The master cylinder housing is screwed into the inside surface of the sleeve member and the shell of the vacuum brake booster is screwed onto the outside surface of the sleeve member. When the internal components of the master cylinder and vacuum brake booster are aligned within the master cylinder such that fluid communication occurs between the reservoir and bore of the master cylinder in the absence of an input force being applied to the vacuum brake booster, the master cylinder housing and shell of the vacuum brake booster are held stationary. Thereafter the sleeve member is rotated or screwed into the shell to lock the position of the internal components and firmly attach while sealing the master cylinder to the shell of the vacuum brake booster.

An advantage of this invention occurs since the sleeve connection member uniformly transfers reaction force from the master cylinder to the shell of the vacuum brake booster to eliminate localized stress areas in the shell.

It is an object of this invention to provide a method of connecting a housing of a master cylinder with a shell of a vacuum brake booster through the use of a sleeve member which locks the relative position of the components once a desired alignment is achieved for the internal components of the master cylinder and vacuum brake booster.

These advantages and objects should be apparent from reading this specification while viewing the drawing.

The drawing is a sectional view of a master cylinder and vacuum brake booster combination made according to this invention.

The master cylinder and vacuum brake booster combination 10 is made up of a master cylinder 12 and a vacuum brake booster 14. The master cylinder 12 is connected to the wheel brakes 16 and 18 of a vehicle while the vacuum brake booster 14 is connected by push rod 20 to a brake pedal 22. In response to an input applied to brake pedal 22, and with the vehicle operating, vacuum from the intake manifold 24 communicated to the brake booster 14, a pressure differential is created which provides the motive power through which the vacuum brake booster 14 develops an output force to effect a brake application.

In more particular detail the master cylinder 12 which is manufactured in accordance with the principles set forth in U.S. patent application Ser. No. 676,978, is injected molded from a plastic material. The plastic material is reinforced with a metal insert 30. The plastic has a flange 32 with a seal 34 located in a groove therein. A compensator port 36 connects a reservoir 38 with the bore 40 of the master cylinder 12. A passage 42 communicates the reservoir 38 to a point adjacent flange 32. The bore 40 which is formed during the moldings with the plastic has a series of flutes or grooves 44 and 46 located adjacent end 48. The metal insert 30 has threads 50 for a set distance, from end 48. A first piston 52 which is located in bore 40 is connected to a second piston 54. A connection member 56 joins the first piston 52 with the second piston 54. The first piston 52 in conjunction with bore 40 forms a first chamber 58 in the master cylinder 12 while the first and second pistons 52 and 54 in conjunction with the bore 40 forms a second chamber 60 in the master cylinder 12.

A sleeve member 62 which has an internal threaded section 64 and an external threaded section 66 is attached to the metal insert 30 by screwing the threaded sections 50 and 64 together. A flange 68 on sleeve 62 engages seal 34 on flange 32 to prevent fluid communication between passage 42 and the surrounding environment.

The sleeve 62 has a slot 70, although an external protrusion would also work which extends through the threaded section 64. The slot 70 and exterior surface of the metal insert 30 form a passage 72 between passage 42 and the end 48 of the metal insert 30. The sleeve 62 has a lip 74 that provides a stop for seal 76. The seal 76, sleeve 62 and projection 98 define a compensator chamber 75. Fluid from reservoir 38 flows through passage 72 into compensator chamber 75. In the rest position shown, fluid from the compensator chamber 75 flows through grooves 44 and 46, past seal 51 and into chamber 60.

The vacuum brake booster 14 has a front shell 78 which is attached to a rear shell 80 by a twist lock arrangement 82. A diaphragm 84 and backing plate 86 are connected to a hub 88 to separate the interior of the brake booster 14 into a front chamber 90 and a rear chamber 92. The hub 88 has a rearward projection 94 that extends through an opening 96 in shell 80 and a forward annular projection 98. The hub 88 has a stepped bore 100 which extends from the end 102 of the forward projection 98 to end 104 of the rearward projection 94. The peripheral surface of forward projection 98 engages lip 74 and seal 76 when end 102 engages piston 54. A spring clip 106 located in groove 108 in the forward projection 98 engages shoulder 110 to connect piston 54 with projection 98. A reaction disc 112 is located in bore 100 adjacent guide surface 114 of the plunger 116 connected to push rod 20. A poppet seal 118 has a fixed end 120 attached to the interior of the rearward projection and a free end 122 attached to a flexible section 124. A return spring 126 located between the fixed end 120 and shoulder 128 on push rod 20 urges seat 130 on plunger 116 into engagement with the free end 122 of the poppet seal 118 as plunger 116 is retained in the bore 100 by stop 132. A second spring 134 urges the free end 122 of poppet seal 118 against the seat 130 to allow vacuum communication through passage 136 past seat 138 into section 111 of bore 100 and through passage 140 into chamber 92. A return spring 142 acts on hub 88 to hold the hub 88 and pistons 52 and 54 attached thereto in a rest position as shown in the drawing.

Shell 78 has a first evolutive section 144 which extends to a center ring 146 and a second evolutive section 148 which extends to a lip portion 150.

The first and second evolutive sections 144 and 148 have opposite direction curves, that is they meet at a peak to form ring section 146. The lip section 150 has threads 151 thereon which are matched with the threads 66 on sleeve 62 to join the master cylinder 12 to the vacuum brake booster 14.

The master cylinder 12 and vacuum brake booster 14 are joined together in the following manner:

The pistons 52 and 54 are inserted into bore 40 and the sleeve 62 joined to the metal insert 30 by screwing threads 50 and 64 together. Thereafter, the front shell 78 is joined to the sleeve 62 by screwing threads 66 with respect to threads 151 on lip section 150. When piston 54 moves into the forward projection 98, clip 106 snaps into groove 108 to engage shoulder 110 and form a rigid connection between hub 88 and piston 54. The shell 78 is rotated with respect to the reservoir 38 until lip seal 53 on piston 52 moves past compensator port 36 and interrupts fluid communication between reservoir 38 and bore 40. Thereafter, the reservoir 38 is reversely rotated to a vertical position as indicated by the alignment of indicia 160, at this position fluid communication is again established through compensator port 36. With the compensator port alignment established, the master cylinder 12 and vacuum brake booster 14 are held stationary and sleeve 62 rotated by screwing threads 66 into threads 151 on lip 150. When seal 162 engages section 148 the master cylinder 12 will be locked to the vacuum brake booster 14.

In operation, when vacuum is produced at the manifold 24, air is continually evacuated from chamber 90. In the rest position shown, air is evacuated from chamber 92 by way of passage 140, section 111 of bore 100, past seat 138, and into passage 136 to chamber 90.

Fluid communication from reservoir 38 to bore 40 occurs through compensator port 36 and passage 42, slot 72, compensator chamber 75, slots or grooves 44 and 46 past seal 51 and into bore 40.

In response to an input from an operator, pedal 22 moves push rod linearly to move plunger 116, movement of plunger 116 allows spring 134 to move free end 122 against seat 138 and interrupts vacuum communication through section 111 of bore 100. Further movement of plunger 116 moves seat 130 away from the free end 122 to allow air to enter chamber 92 by way of bore 100, section 111 and passage 140. With air in chamber 92 and vacuum in chamber 90, a pressure differential is created across wall or diaphragm 84 and backing plate 86. This pressure differential acts on the diaphragm 84 and backing plate 86 to produce a force that moves pistons 52 and 54 into chambers 58 and 60, respectively, to provide the wheel brakes with fluid pressure to effect a brake application.

The shape of the evolutive section 148 counteracts any deflective forces that are created as a result of the resistance of pistons 52 and 54 to movement.

When the input force on pedal 22 terminates, spring 126 acts on push rod 20 to move seat 130 on plunger 116 into engagement with free end 122 of poppet member 118 to interrupt the communication of air to chamber 92. Further movement moves the free end 122 away from seat 138 reestablishes vacuum communication. With vacuum evacuating air from chamber 92, the pressure differential is reduced and eventually eliminated. As the vacuum level in chambers 90 and 92 is equalized, return spring 142 acts on hub 88 to move the hub 88 and pistons 52 and 54 to the rest position shown in the drawing.

We claim:

1. In a master cylinder and vacuum brake booster combination for supplying a brake system with an operational force in response to an input force, means for connecting the housing of the master cylinder with a shell of the vacuum brake booster, said connecting means comprising:

a sleeve member having an internal threaded section and an external threaded section, said housing being attached to said sleeve member through said internal threaded section, said shell being attached to said sleeve member through said external threaded section, said shell being rotated on said external threads while said sleeve is held stationary until a preset distance is produced between said housing of the master cylinder and said shell, said housing of said master cylinder and shell thereafter being held stationary and said sleeve rotated to lock said housing and sleeve together and thereby maintain said preset distance.

2. In the master cylinder and vacuum brake booster combination as recited in claim 1 wherein said sleeve includes:

a flange that engages said housing of said master cylinder to define an external flow path from a reservoir of the master cylinder to the interior of the housing of the master cylinder.

3. In the master cylinder and vacuum brake booster combination as recited in claim 2 wherein said vacuum brake booster includes:

an output member that extends from a movable wall into engagement with a piston within the housing of said master cylinder, said sleeve surrounding a portion of said output member to define a compensator chamber adjacent the end of the housing of said master cylinder, said housing having an axial slot along its interior to communicate the compensator chamber with an operational chamber contained therein.

4. A method of attaching a housing of a master cylinder to a shell of a vacuum brake booster, comprising the steps of:

inserting a piston assembly within a bore of the housing of the master cylinder, said housing having a reservoir with a compensator port through which the reservoir is connected to said bore and a passage through which the reservoir is connected to a compensator chamber, said housing having threads on the end thereof;

screwing the threads on the housing into threads on a sleeve member, said sleeve member having a flange that engages the housing to seal the compensator chamber from the environment, said sleeve having external threads thereon;

screwing the shell of the vacuum brake booster onto the external threads of the sleeve member to bring an output push rod into engagement with said piston to interrupt communication between the reservoir and bore;

rotating the reservoir with respect to the shell to reinitiate communication through said compensator port;

holding said housing and shell in a fixed relationship; and screwing said sleeve into said shell to lock the housing to the shell.

5. The method of attaching a housing of a master cylinder to a shell of a vacuum brake booster as recited in claim 4 further comprising the steps:

locating the reservoir in a vertical position when reestablishing the communication between the reservoir and bore through the compensator port.

6. The method of attaching a housing of a master cylinder to a shell of a vacuum brake booster as recited in claim 5 further including the steps of:

attaching the piston to the push rod through a clip member that snaps into a shoulder of the piston.

* * * * *